Jan. 2, 1934.  L. S. FRAPPIER ET AL  1,941,676
FILM GATE FOR MOTION PICTURE PROJECTION MACHINES
Original Filed Aug. 31, 1928  5 Sheets-Sheet 3
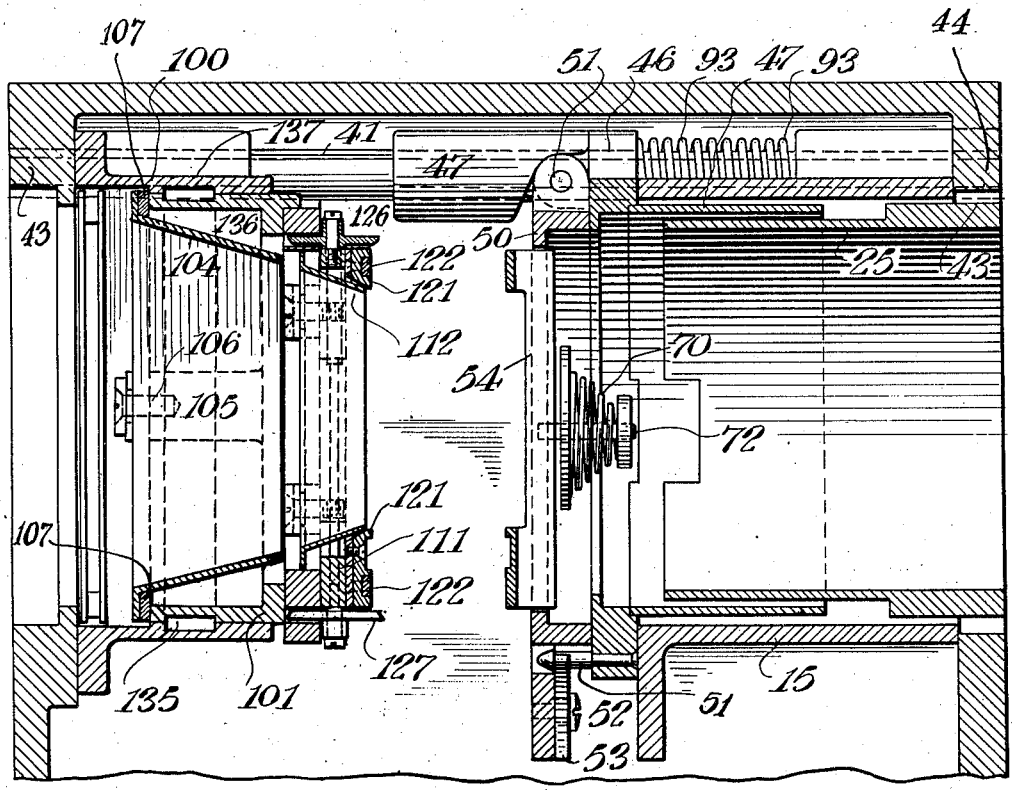
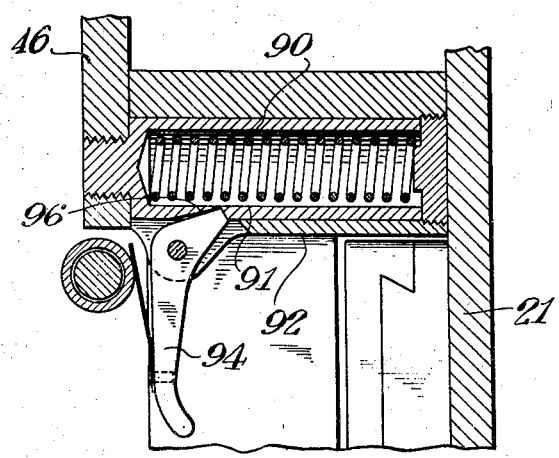
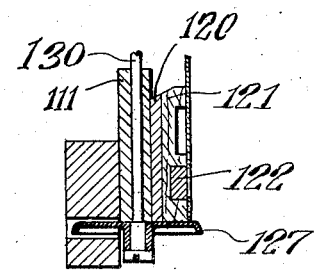
INVENTORS
Louis S. Frappier
BY Ewald Boecking
Howard W. Dix
ATTORNEY

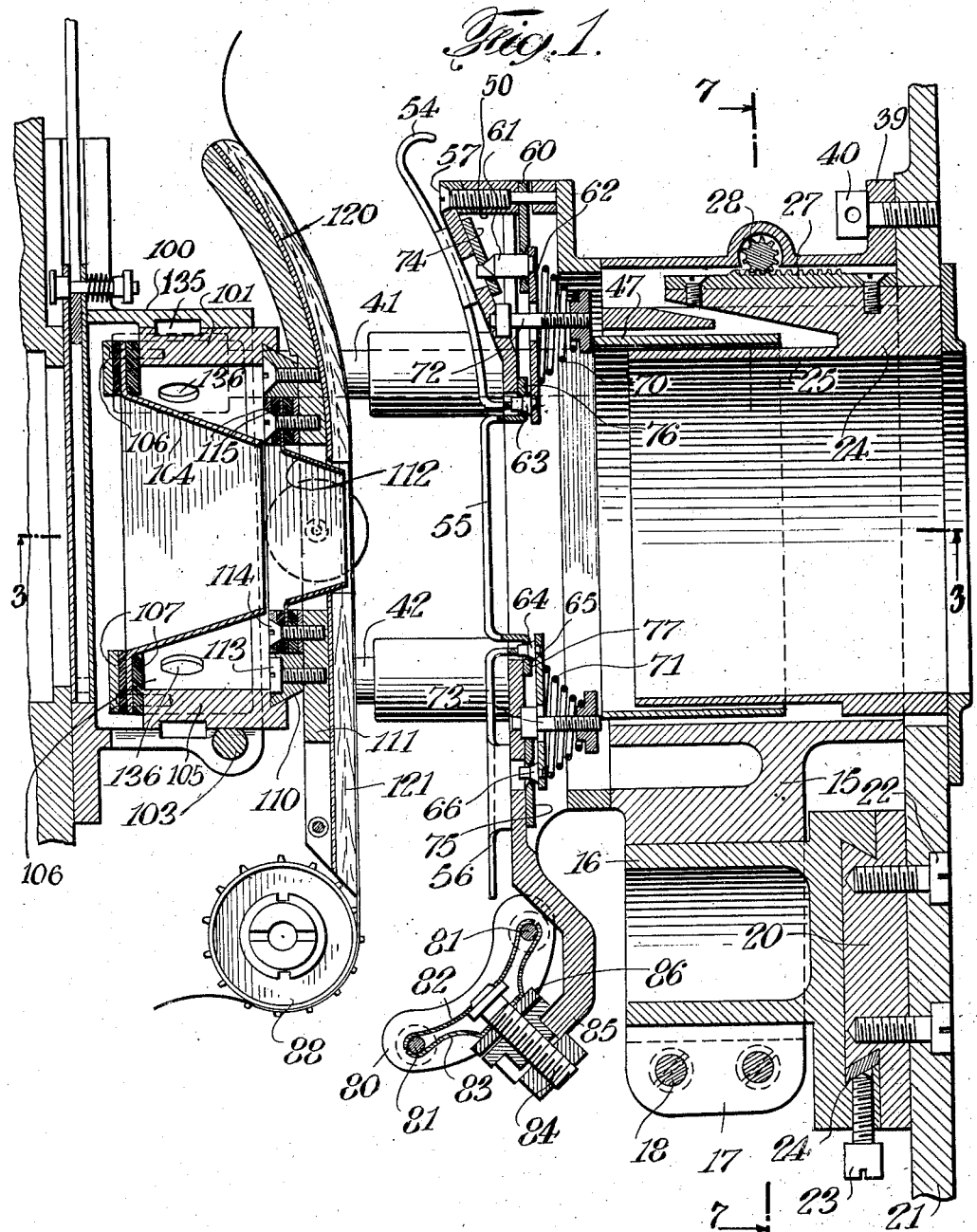

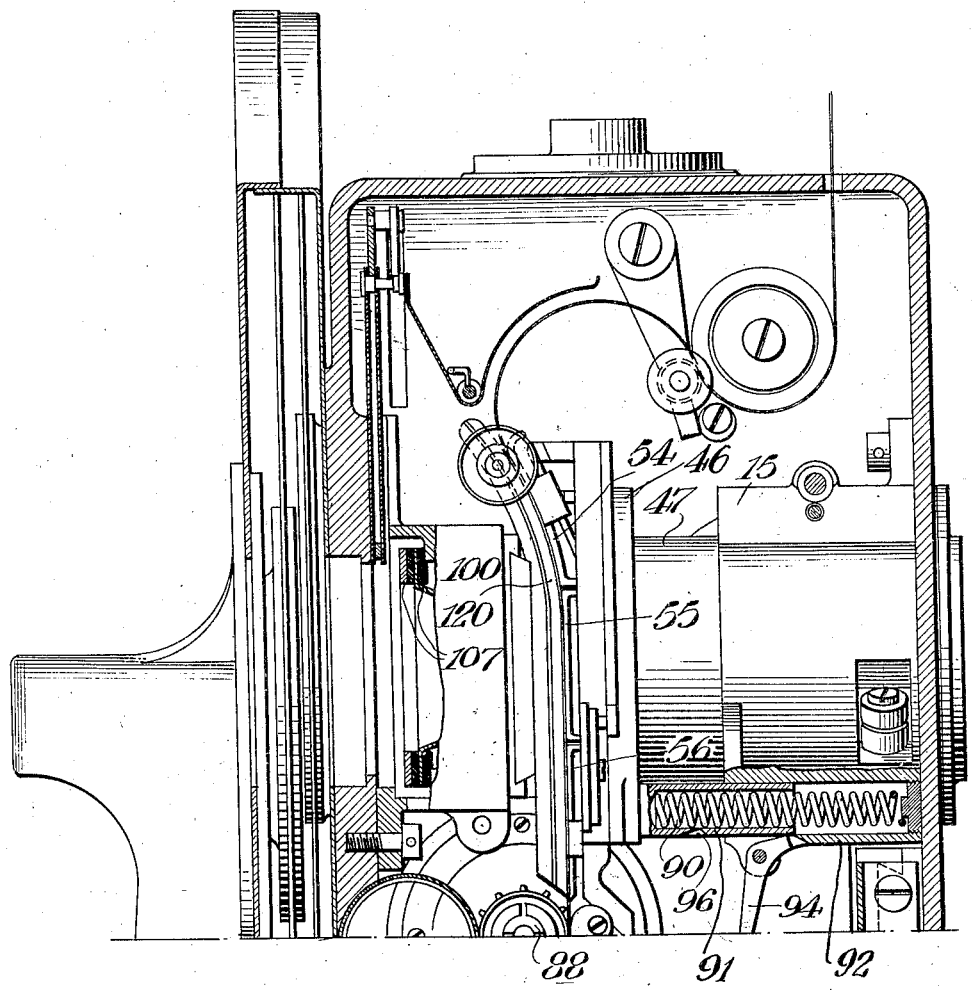

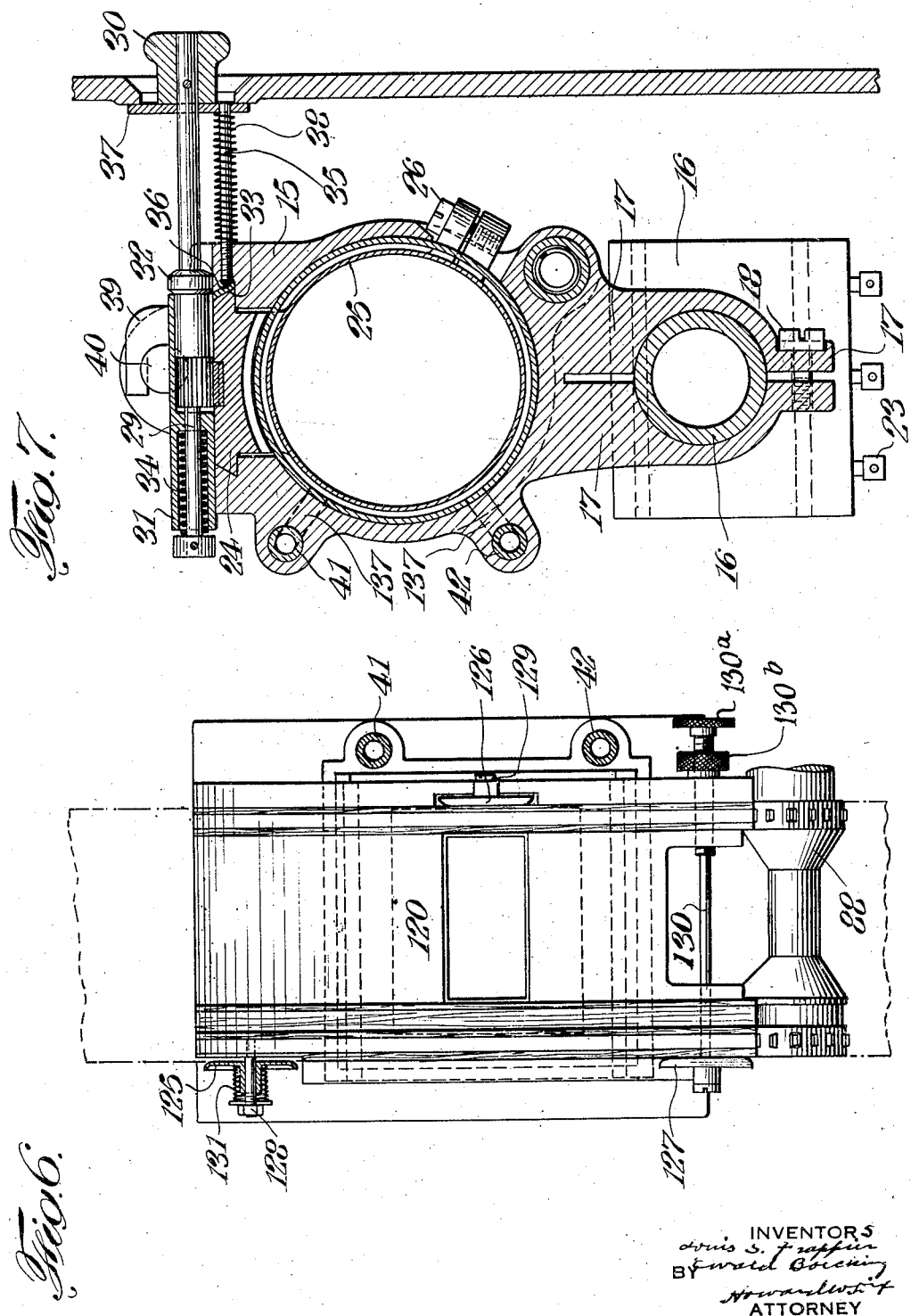

Jan. 2, 1934.  L. S. FRAPPIER ET AL  1,941,676
FILM GATE FOR MOTION PICTURE PROJECTION MACHINES
Original Filed Aug. 31, 1928  5 Sheets-Sheet 5
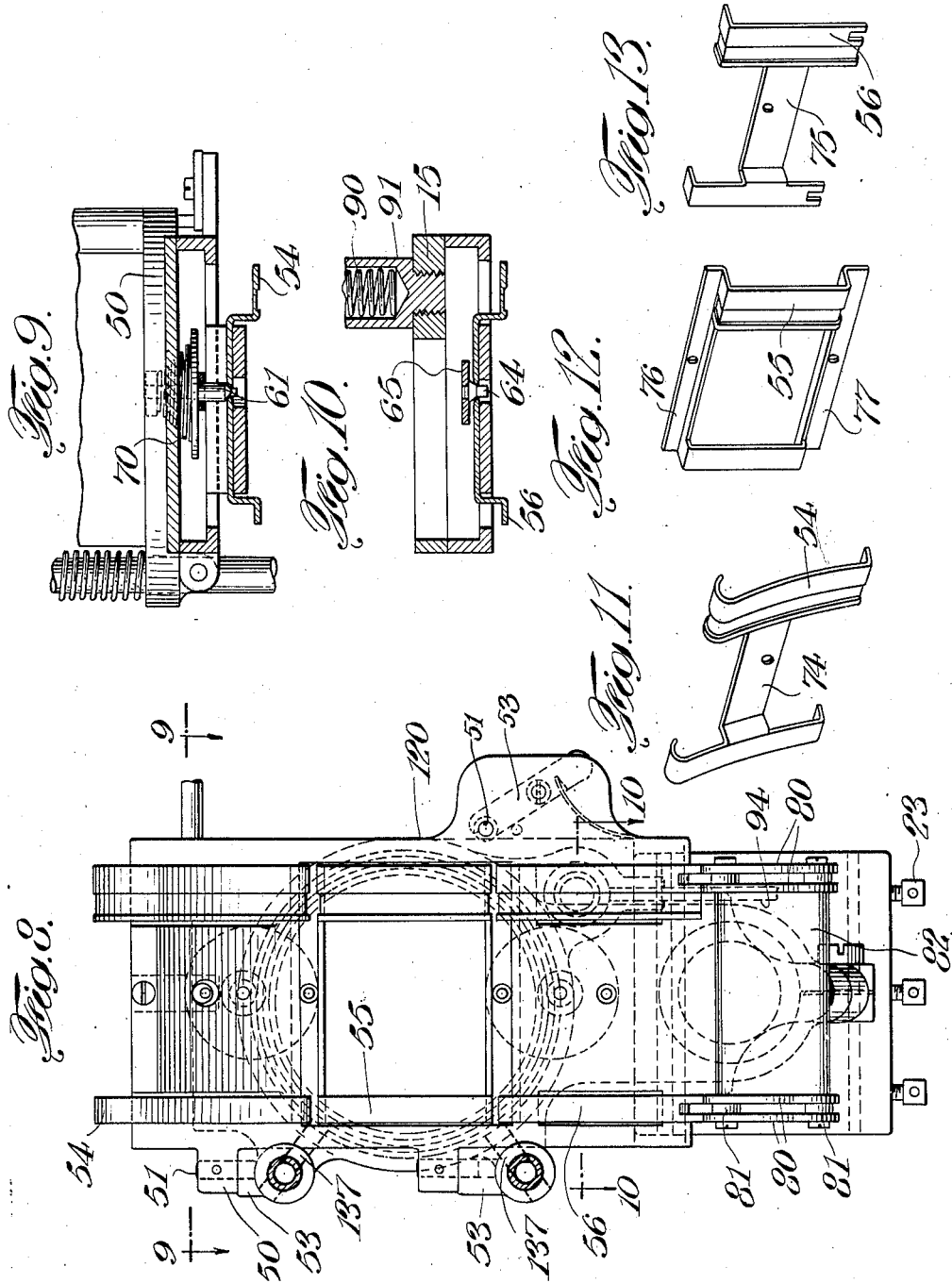

Patented Jan. 2, 1934

1,941,676

UNITED STATES PATENT OFFICE 1,941,676

FILM GATE FOR MOTION PICTURE PROJECTION MACHINES

Louis Simon Frappier and Ewald Boecking, Brooklyn, N. Y., assignors to International Projector Corporation, New York, N. Y., a corporation of Delaware Original application August 31, 1928, Serial No. 303,162. Divided and this application October 23, 1928. Serial No. 314,423

16 Claims. (Cl. 88—17)

This invention relates to motion picture apparatus, and more particularly to a new and improved mechanism for intermittently passing a film in front of a projection light.

This application is a division of our copending application, Serial No. 303,162, filed August 31, 1928, for Improvements in projection machine.

In passing a film through the light rays of the projection apparatus, it is desirable to provide an aperture plate which will hold the film in its desired position, and at the same time will cause only a minimum of wear thereon. Due to the extreme heat of the projection light it is desirable also to provide means for insulating the material of the aperture plate against the direct action of the light rays, thereby shielding the film from a portion of the radiant heat. Furthermore, the film gate should be capable of firmly holding the film against the aperture plate, but should be sufficiently resilient to permit irregularities in the film to pass therethrough.

An object of the present invention is to provide for the intermittent passage of a film over an aperture plate while effectively shielding the film from the radiant heat of the light rays.

Another object is to provide ventilating means whereby the light tubes may be cooled by circulation of air.

A further object is to provide a unitary construction whereby the entire film gate and aperture plate may be carried by a single main support.

A still further object is to provide for the ready removal of the various parts for purposes of inspection and repair.

Another object is to provide a simple means for adjusting the various parts of the mechanism and for maintaining said mechanism in its adjusted position.

The above objects and others which will be apparent as the nature of the invention is disclosed, are accomplished by mounting the film gate and aperture plate on a casting which is clamped to the frame of the machine. Light shields are provided between the light source and the aperture plate for absorbing a portion of the radiant heat of the light rays and are cooled by a forced circulation of air which may be induced by fan blades forming part of the shutter mechanism. The film gate itself is slidably secured to the casting and may be readily moved from film engaging to film releasing position by a single control. Associated with the film gate are a plurality of pressure shoes which are independently mounted and resiliently held against the film whereby irregularities in the film may pass therethrough substantially unimpeded. The pressure shoe and frame therefor may be released and pivoted about the supporting structure for the purposes of adjustment and cleaning. The lens tube is carried by the supporting casting above referred to and may be linearly adjusted with respect thereto for focusing the light rays upon the distant screen.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a longitudinal section showing the film gate in open position;

Fig. 2 is a side elevation showing the film gate in closed position;

Fig. 3 is a horizontal section taken along the lines 3—3 of Fig. 1;

Fig. 4 is an enlarged detail view of the locking mechanism for securing the gate in disengaged position;

Fig. 5 is an enlarged sectional view of a portion of the aperture plate;

Fig. 6 is a front elevation of the aperture plate and intermittent sprocket;

Fig. 7 is a transverse sectional view taken on the line 7—7 of Fig. 1;

Fig. 8 is a front elevation of the film gate showing the pressure shoes;

Fig. 9 is a section taken on the line 9—9 of Fig. 8 showing the film gate support;

Fig. 10 is a section taken on the line 10—10 of Fig. 8; and

Figs. 11, 12 and 13 are perspective views of the upper, intermediate and lower pressure shoes respectively.

Like reference characters denote like parts in the several figures of the drawings.

In the following description and in the claims parts will be identified by specific names for convenience, but they are intended to be as generic in their application to similar parts as the art will permit.

Referring to the drawings more in detail, the present invention is disclosed as comprising a main casting 15 (Fig. 1) which is supported from stud 16 and provided with split collar 17 (Fig. 7) which is clamped by any suitable means such as set screws 18. Stud 16 is dove-tailed in sliding engagement with bracket 20 and may be moved transversely thereto for removing the entire apparatus from the machine. Bracket 20 is supported from wall 21 of the machine by screws 22. Set screw 23 and key 24 may be employed for securing stud 16 in its desired position on said bracket.

Casting 15 carries a lens tube housing 24 which is dove-tailed therein as shown in Fig. 7, and adapted to slide longitudinally thereof. Lens tube 25 is carried in said housing and clamped by set screw 26. Housing 24 may be adjusted longitudinally by rack 27 and pinion 28, said pinion being carried on shaft 29 which extends through a suitable hole in the side of the machine and terminates in an operating knob 30. Shaft 29 is journalled in tube 31 and is provided with a shoulder 32 which is resiliently urged against key 33 by means of spring 34. Shoulder 32 causes frictional engagement between said key and the dove-tailed section of housing 24 and prevents undesired movement thereof. Rod 35 is secured in casting 15 and enters a notch 36 in key 33 for preventing longitudinal movement of said key. Rod 35 also supports plate 37 which shields the opening through which rod 32 passes and is held in operative position by spring 38.

Casting 15 is provided with an ear 39 (Figs. 1 and 7) which may be secured to the frame 21 of the machine by set screw 40 thereby preventing movement of the assembly, which might be caused by the vibration of the machine. Lens tube 25 may contain suitable lenses for focusing the light upon the distant screen and may be adjusted for focusing said light by means of rack and pinion 27 and 28 above described.

Casting 15 supports tubes 41 and 42 which extend across the projection head and are aligned at their ends with holes 43 and 44 (Fig. 3) in the frame of the machine. Base plate 46 is formed with tubular portions 47 which are slidably engaged on rods 41 and 42. Said base plate carries a light shield 47 in telescoping relationship to lens tube 25.

Shoe frame 50 is pivoted to base plate 46 as by rod 51 passing through cooperating ears in said parts and is held in closed position by means of pin 51 and latch 53 cooperating therewith (Figs. 3 and 8). A plurality of pressure shoes 54, 55 and 56 (Figs. 1 and 8 to 13) are loosely hung from frame 50 by link connections and are provided with a plurality of film engaging parts which are adapted to securely hold the film against the aperture plate to be described.

Shoe 54 is hung from screw 57 which is carried in frame 50, by means of link 60 and pin 61 which is secured to the center portion of said shoe by a knife edge connection. Disk 62 is hung from pin 61 and carries pin 63 from which shoe 55 is supported. Shoe 55 supports pin 64 which is carried by disk 65. Said disk also carries pin 66 which supports shoe 56. The various connections between said shoes and pins are preferably of knife edge formation whereby friction is minimized. Springs 70 and 71 are mounted in fixed relationship to frame 50 by means of rods 72 and 73 respectively. Said springs cooperate with disks 62 and 65 for holding the pressure shoes in film engaging relationship. The shoes are, however, substantially free to move horizontally in response to said springs by reason of the knife edge supports above described whereby friction is reduced to a minimum. Yokes 74 and 75 of shoes 54 and 46 and flanges 76 and 77 of shoe 55 contact with a portion of frame 50, limiting the movement of said pressure shoes.

Pressure shoes 80 (Figs. 1 and 8) are mounted upon rods 81 which are resiliently supported by spring sections 82 and 83 from bolt 84. Said bolt is secured in an extension 85 of frame 50. The tension of springs 82 and 83 may be adjusted by nut 86 which is threaded upon said bolt in contact with spring member 83. Shoes 80 are accordingly resiliently held in contact with the film on intermittent sprocket 88 when the film gate is in closed position. Sprocket 88 may be mounted upon the frame of the machine and intermittently operated by any desired means (not shown) for drawing the film past the aperture plate above described.

The film gate is normally held in extended position by means of spring 90 carried in tube 91 which is secured to base plate 46 and telescopes in a cooperating tube 92 carried by the frame 21 of the machine. Spring 93 (Fig. 3) carried on rod 41 serves to balance the action of spring 90 and prevent the gate from binding. The gate is locked in open position by a latch 94 which is pivotally mounted upon tube 92 and engages the slot 96 in tube 91.

Housing 100 (Figs. 1 and 3) is carried upon tubes 41 and 42 and may be secured to the framework of the machine adjacent the opening through which the light rays are passed. Tube 101 is secured in housing 100 and may be locked in position by any desired means as by rod 103 passing through aligned apertures in said housing and frictionally engaging said tube. Said tube 101 carries light shield 104 which is mounted upon posts 105 by means of screws 106 and secured between asbestos washers 107 whereby the heat of said shield is prevented from being transferred to said tube 101.

Frame 110 slides longitudinally into tube 101 and carries backing plate 111 of the aperture plate which is secured thereto as by screws 113. Light shield 112 is secured to said backing plate by screws 114 which are threaded therein, said light shield being clamped between asbestos washers 115 which minimize heat transference from said tube to said backing plate.

Aperture plate 120 is secured to backing plate 111 and carries strips 121 of suitable material as for example, ebony for contacting with the passing film. Said strips are provided with raised positions for engaging the film, and with metallic inserts 122, at the position which will be occupied by the perforations of the film whereby excessive wear at that point will be prevented.

The film may be guided over said aperture plate by a plurality of rollers 125, 126 and 127. Rollers 125 and 126 are journalled in backing plate 111 by bolts 128 and 129 respectively, and suitably positioned to cooperate with the edge of said film. Roller 125 may be resiliently secured in position by spring 131 whereby a slight longitudinal movement is permitted to compensate for irregularities in the film. Roller 127 is mounted on shaft 130 which extends across the aperture plate and terminates in adjusting knob 130a. Lock nut 130b may be used for securing the shaft in the desired position. Roller 127 may accordingly be adjusted to the width of the film being used.

Housing 100 and tube 101 are formed with an intervening annular opening 135 therebetween which communicates with the space between tube 101 and light shield 104 by a plurality of holes 136. Said annular opening 135 communicates with tube 41 by hole 137. Circulation of air for cooling purposes is obtained by suitable vanes on the shutters (not shown) or other suitable means which force air along the path of the light rays through light shield 104, thence around the end of said light shield through holes 136 into annular aperture 135, through hole 137 into tube 41. Said tube is open through bores 43 and 44 at both ends whereby the air may be discharged at the center of the shutter while cold air is drawn from the outside of the machine.

In order to open the film gate to permit insertion of a film, base plate 46 may be moved longitudinally against the pressure of springs 90 and 93 and locked by means of latch 94. For the purpose of adjusting the tension of springs 70 and 71, frame 50 may be pivoted about rod 51 after releasing catch member 53. The entire device may be pivotally adjusted about pin 16 and may be transversely adjusted by varying the relation of said pin with respect to bracket 20. Light shields 104 and 113, which may be formed of copper or other heat conducting material, prevent the light rays from acting directly upon the support for the aperture plate, and serve to insulate the radiant heat from said plate. Asbestos washers avoid a direct metallic connection between said light shields and their supports and further minimize the heat transfer.

The particular mounting for the pressure shoes above described permits them to be operated progressively in response to variations in thickness of the film. The pressure shoes are freely suspended from knife edges and are adapted to be moved with a minimum amount of friction.

The cooling of the light shields is facilitated without the use of additional apparatus by causing the shutter to operate as a fan and by utilizing the hollow supporting tubes to secure the return flow. This feature is important, particularly where a wide film is employed, since the projection light is sufficiently powerful to raise the temperature of the parts to a dangerously high point unless special heat insulating and cooling means are employed.

Although a specific embodiment of the invention has been shown and described for purposes of illustration, it is to be understood that various omissions, substitutions and changes in the forms and details of the device illustrated and in its operation, may be made by those skilled in the art without departing from the scope of the invention, which is not to be limited by the present specific description, but only in accordance with the following claims.

What is claimed is:

1. A film gate comprising upper, intermediate and lower pressure shoes, a supporting framework, means for hanging said upper shoes from said framework, means for hanging said intermediate shoe from said upper shoe, means for hanging said lower shoe from said intermediate shoe, and resilient means for maintaining said shoes in film engaging relationship.

2. In a film gate, a plurality of pressure shoes, a link for supporting the upper of said shoes, a second link carried thereby and supporting the second of said shoes, resilient means associated with said second link, a third link supported by said second shoe and in turn supporting a third shoe, and resilient means associated with said third link, said resilient means being adapted to maintain said shoes in film engaging position.

3. An aperture plate comprising a metallic backing member, and ebony film engaging strips supported thereon, said film engaging strips having metallic inserts opposite the perforations of said film.

4. In combination, an aperture plate having an aperture therein, a backing plate carrying said aperture plate and having an aperture larger than said first aperture and registering therewith, a tapered heat shield carried by said backing plate and extending within both of said apertures and having an opening registering with said first aperture, said heat shield being spaced from said aperture plate and from said backing plate whereby to provide an air space around said heat shield and to shield said aperture plate and said backing plate from the heat of projection rays.

5. In combination, an aperture plate having an aperture therein, a backing plate carrying said aperture plate and having an aperture registering with said first aperture, a heat shield carried by said backing plate and extending within both of said apertures and having an opening registering with said first aperture, said heat shield being spaced from said aperture plate and from said backing plate whereby to provide an air space around said heat shield and to shield said aperture plate and said backing plate from the heat of projection rays.

6. In combination, an aperture plate having an aperture therein, a backing plate carrying said aperture plate and having an aperture registering with said first aperture, a heat shield extending within both of said apertures and having an opening registering with said first aperture, said heat shield being spaced from said aperture plate and from said backing plate whereby to provide an air space around said heat shield and to shield said aperture plate and said backing plate from the heat of projection rays, said heat shield having supporting flanges mounted on said backing plate and heat insulating members interposed between said flanges and said backing plate to retard direct conduction of heat therebetween.

7. In combination, an aperture plate having an aperture therein, a housing supporting said aperture plate, said housing having a central chamber registering with and larger than said aperture, a heat shield mounted within said chamber and extending axially thereof and having an opening registering with said aperture, said shield being spaced from the walls of said chamber to form an air passage for cooling air around said shield, said housing having an additional air passage formed therein extending around said chamber and having a plurality of peripherally spaced parts interconnecting said additional air passage and said chamber whereby circulation of air may be obtained.

8. In combination, an aperture plate having an aperture therein, a housing supporting said aperture plate, said housing having a central chamber registering with and larger than said aperture, a heat shield mounted within said chamber and extending axially thereof and having an opening registering with said aperture, said shield being spaced from the walls of said chamber to form an air passage for cooling air around said shield, said housing having an additional air passage formed therein extending around said chamber and having a plurality of peripherally spaced parts interconnecting said additional air passage and said chamber whereby circulation of air may be obtained, and an air discharge duct communicating with said additional air passage.

9. In combination, an aperture plate having an aperture therein, a housing supporting said aperture plate, said housing having a central chamber registering with and larger than said aperture, a heat shield mounted within said chamber and extending axially thereof and having an opening registering with said aperture, said shield being spaced from the walls of said chamber to form an air passage for cooling air around said shield, said housing having an additional air passage formed therein extending around said chamber and having a plurality of peripherally spaced parts interconnecting said additional air passage and said chamber whereby circulation of air may be obtained, a support for said housing comprising an open ended tubular member and an air duct connecting said member with said additional air passage.

10. In combination, an aperture plate having an aperture therein, a housing supporting said aperture plate, said housing having a central chamber registering with and larger than said aperture, a heat shield mounted within said chamber and extending axially thereof and having an opening registering with said aperture, said shield being spaced from the walls of said chamber to form an air passage for cooling air around said shield, said shield having supporting flanges mounted on said housing and heat insulating means interposed between said flanges and said housing whereby direct transfer of heat therebetween is retarded.

11. In combination, an aperture plate having an aperture therein, a housing supporting said aperture plate, said housing having a central chamber registering with and larger than said aperture, a heat shield mounted within said chamber and extending axially thereof and having an opening registering with said aperture, said shield being spaced from the walls of said chamber to form an air passage for cooling air around said shield, and an additional heat shield associated with said aperture plate and extending within said aperture to shield said plate from heat rays, said additional shield being spaced from said aperture plate to provide a passage for air currents therebetween.

12. In combination, an aperture plate having an aperture therein, a housing supporting said aperture plate, said housing having a central chamber registering with and larger than said aperture, a heat shield mounted within said chamber and extending axially thereof and having an opening registering with said aperture, said shield being spaced from the walls of said chamber to form an air passage for cooling air around said shield, and an additional heat shield associated with said aperture plate and extending within said aperture to shield said plate from heat rays, said additional shield being spaced from said aperture plate to provide a passage for air currents therebetween, both said shields being in substantial alignment and independent mounting means for said shield including heat insulating members whereby direct transfer of heat from said shields to said housing and to said aperture plate is retarded.

13. In combination, an aperture plate having an aperture therein, a backing plate carrying said aperture plate and having an aperture registering with said first aperture, a heat shield carried by said backing plate and extending within both of said apertures and having an opening registering with said first aperture, said heat shield being spaced from said aperture plate and from said backing plate whereby to provide an air space around said heat shield and to shield said aperture plate and said backing plate from the heat of projection rays, a housing carrying said backing plate and having an internal chamber registering with said apertures and a second heat shield mounted within said chamber and projecting said housing from the heat of projection rays.

14. A film gate comprising a supporting framework, a plurality of pressure shoes spaced in the direction of movement of a film, means for supporting the first of said shoes on said framework and means for supporting each of the others of said shoes from the preceding shoe and resilient means carried by said framework and independently holding each of said shoes in film engaging position.

15. A film gate comprising a supporting framework, a plurality of pressure shoes spaced in the direction of movement of a film, means for supporting the first of said shoes on said framework and means for supporting each of the others of said shoes from the preceding shoe, each said supporting means comprising substantially a hanging, point connection.

16. A film gate comprising a supporting framework, a plurality of pressure shoes spaced in the direction of movement of a film, means for supporting the first of said shoes on said framework and means for supporting each of the others of said shoes from the preceding shoe, and spring means engaging each of said shoes at spaced points and independently holding each of said points in film engaging position whereby said shoes accommodate themselves to variations in said film.

LOUIS SIMON FRAPPIER.
EWALD BOECKING.